United States Patent
Gerhart et al.

(10) Patent No.: US 10,466,911 B2
(45) Date of Patent: Nov. 5, 2019

(54) METHOD USING LOGICAL BASED ADDRESSING FOR LATENCY REDUCTION

(71) Applicant: Western Digital Technologies, Inc., San Jose, CA (US)

(72) Inventors: Darin Edward Gerhart, Oronoco, MN (US); Nicholas Edward Ortmeier, Rochester, MN (US); Mark David Erickson, Mantorville, MN (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 58 days.

(21) Appl. No.: 15/845,005

(22) Filed: Dec. 18, 2017

(65) Prior Publication Data

US 2019/0187912 A1 Jun. 20, 2019

(51) Int. Cl.
*G06F 3/06* (2006.01)
*G06F 12/0879* (2016.01)

(52) U.S. Cl.
CPC .......... *G06F 3/0611* (2013.01); *G06F 3/0632* (2013.01); *G06F 3/0653* (2013.01); *G06F 12/0879* (2013.01); *G06F 2212/60* (2013.01)

(58) Field of Classification Search
CPC ...... G06F 3/0601; G06F 3/0602; G06F 3/061; G06F 3/0611; G06F 3/0632; G06F 12/0879; G06F 13/161; G06F 2212/1024; G06F 2212/60; G06F 3/0653
See application file for complete search history.

(56) References Cited

U.S. PATENT DOCUMENTS

| | | | |
|---|---|---|---|
| 2009/0276570 A1* | 11/2009 | Cheng ................. | G06F 11/3419 711/115 |
| 2014/0237113 A1* | 8/2014 | Gulati ................... | H04L 47/283 709/224 |
| 2014/0244898 A1* | 8/2014 | Liu ........................ | G06F 12/126 711/103 |
| 2017/0177241 A1 | 6/2017 | Erickson et al. | |
| 2017/0255414 A1 | 9/2017 | Gerhart et al. | |
| 2017/0344284 A1* | 11/2017 | Choi ...................... | G06F 3/0619 |
| 2018/0067684 A1* | 3/2018 | Benisty .................. | G11C 29/52 |
| 2018/0069658 A1* | 3/2018 | Benisty ................. | H04L 1/0057 |
| 2018/0260137 A1* | 9/2018 | Tsou ..................... | G06F 3/0616 |
| 2018/0356998 A1* | 12/2018 | Wu ....................... | G06F 3/0619 |

OTHER PUBLICATIONS

U.S. Appl. No. 15/383,047, filed Dec. 19, 2016 (31 pages).

* cited by examiner

*Primary Examiner* — Thomas J. Cleary
(74) *Attorney, Agent, or Firm* — Patterson & Sheridan, LLP; Steven H. Versteeg

(57) ABSTRACT

A method for control of latency information through logical block addressing is described comprising receiving a computer command, performing a read flow operation on a computer buffer memory based on the computer command; populating at least one metadata frame with data based on logical block address latency information; initiating a serial attached data path transfer for one of transmitting and receiving data to the computer drive and transmitting data to a host based on the second latency.

25 Claims, 8 Drawing Sheets

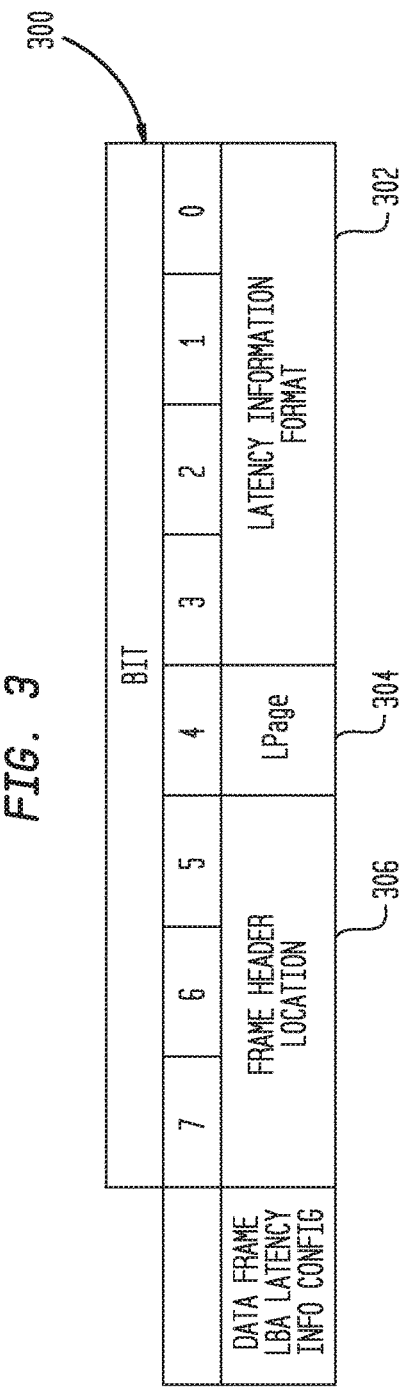

FIG. 5

| LATENCY INFO FORMAT = 1 | BIT | | | | | | | |
|---|---|---|---|---|---|---|---|---|
| | 7 | 6 | 5 | 4 | 3 | 2 | 1 | 0 |
| | 2nd LBA IN SAS FRAME | | | | 1st LBA IN SAS FRAME | | | |
| LBA LATENCY INFORMATION | COLL | ERP | CACHE | MAP | COLL | ERP | CACHE | MAP |

| SAS DATA FRAME HEADER OFFSET | BYTE 3 | BYTE 2 | BYTE 1 | BYTE 0 |
|---|---|---|---|---|
| 0 | | DESTINATION ADDRESS | | FRAME TYPE |
| 4 | | SOURCE ADDRESS | | RESERVED — 601 |
| 8 | CONTROL FLAGS/FILL BYTES | | RESERVED | — 602 |
| 12 | | RESERVED | | — 604 |
| 16 | TARGET TAG | | INITIATOR TAG | |
| 20 | | DATA OFFSET | | |

FIG. 7

| LATENCY INFO FORMAT = 2 | BIT | | | | | | | |
|---|---|---|---|---|---|---|---|---|
| | 7 | 6 | 5 | 4 | 3 | 2 | 1 | 0 |
| FIRST LBA LATENCY INFORMATION | COLLISION INFO | | ERP TYPE | | CACHE TYPE | | MAP INFO | |
| | CPSM SYSTEM LATENCY | | | | | | SERIALIZER | |
| SECOND LBA LATENCY INFORMATION | COLLISION INFO | | ERP TYPE | | CACHE TYPE | | MAP INFO | |
| | CPSM SYSTEM LATENCY | | | | BUFFER ALLOC | | SERIALIZER | |

| SAS DATA FRAME HEADER OFFSET | BYTE 3 | BYTE 2 | BYTE 1 | BYTE 0 |
|---|---|---|---|---|
| 0 | FRAME TYPE | | | |
| 4 | DESTINATION ADDRESS | | | RESERVED |
| 8 | SOURCE ADDRESS | | | |
| 12 | CONTROL FLAGS/FILL BYTES | | RESERVED | |
| 16 | TARGET TAG | | INITIATOR TAG | |
| 20 | DATA OFFSET | | | |

| BIT | 7 | 6 | 5 | 4 | 3 | 2 | 1 | 0 |
|---|---|---|---|---|---|---|---|---|
| LATENCY INFO FORMAT = 3 | | | | | | | | |
| 1st LBA LATENCY DESCRIPTION INDEX | LBA LATENCY SCORE | | | | | | | |
| 2nd LBA LATENCY DESCRIPTION INDEX | LBA LATENCY SCORE | | | | | | | |

FIG. 10

| SAS DATA FRAME HEADER OFFSET | BYTE 3 | BYTE 2 | BYTE 1 | BYTE 0 |
|---|---|---|---|---|
| 0 | | | | FRAME TYPE |
| 4 | DESTINATION ADDRESS | | | |
| 8 | SOURCE ADDRESS | | | RESERVED — 1000 |
| 12 | CONTROL FLAGS/FILL BYTES | | | RESERVED — 1001 |
| 16 | RESERVED | | | |
| 20 | TARGET TAG | | INITIATOR TAG | |
| | DATA OFFSET | | | |

FIG. 14

| BIT | | | | | | | |
|---|---|---|---|---|---|---|---|
| 7 | 6 | 5 | 4 | 3 | 2 | 1 | 0 |
| DATA FRAME LBA LATENCY DEBUG CONTROL | DEBUG INFORMATION FORMAT | | | | | | |

FIG. 15

| SAS DATA FRAME HEADER OFFSET | BYTE 3 | BYTE 2 | BYTE 1 | BYTE 0 |
|---|---|---|---|---|
| 0 | DESTINATION ADDRESS | | | FRAME TYPE |
| 4 | SOURCE ADDRESS | | | RESERVED |
| 8 | CONTROL FLAGS/FILL BYTES | | RESERVED | |
| 12 | RESERVED | | | |
| 16 | TARGET TAG | | INITIATOR TAG | |
| 20 | DATA OFFSET | | | |

METHOD USING LOGICAL BASED ADDRESSING FOR LATENCY REDUCTION

FIELD OF DISCLOSURE

Aspects of the disclosure relate to storage devices for computer and computer server systems. More specifically, aspects of the disclosure relate to methods and apparatus to reduce latency of storage systems connected to computers and computer servers.

BACKGROUND INFORMATION

Field

Many host applications are sensitive to device latency. Such sensitivity may be more pronounced for solid state storage devices. Drive suppliers and customers have a keen interest in understanding and characterizing latency sources and their frequencies.

Solid state storage devices may use logical block provisioning to ensure that NAND management policies are enforced while providing high performance. Some system applications, however, may not be aware of the provisioning status for logical block addressing. An example of this is host data scrubbing and data analysis applications.

Current mechanisms to monitor latency impacts require conventional systems to issue commands over the serial attached SCSI interface to retrieve information. A logical block addressing status is used to determine block provisioning status. Log sense commands are issued to various log pages to retrieve various caching and error statistics to monitor device latency and performance. Mode select commands are used to initiate background media scans or background garbage collection to lessen error recovery procedure (ERP) or NAND policy latency impacts.

The frequency of issuing such latency analysis commands has a direct impact on drive performance. As an example, log, mode, get LBA status, and background control commands are not typically implemented as performance sensitive commands in devices. Host data scrub, data analysis or background media scan functions require using some bandwidth from a host. Host systems prefer to avoid performance impacts when issuing commands to monitor latency information.

There is a need to increase host system performance for a user by minimizing latency.

There is a further need to provide logical block address latency information that avoids use of special purpose commands.

There is further need to provide a cost effective method and apparatus to enhance computer operations involved with storage solutions.

SUMMARY

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

In one non-limiting embodiment, a method for control of latency information through logical block addressing is disclosed comprising receiving a computer command that has been dispatched to a flash translation layer of a computer drive wherein a computer arrangement is operating at a first latency, performing a read flow operation on a computer buffer memory based on the computer command, populating at least one metadata frame with data based on logical block address latency information, initiating a serial attached data path transfer for one of transmitting and receiving data to the computer drive, reading the at least one metadata frame with the logical block address latency information metadata frame, modifying the computer arrangement such that the computer arrangement operates at a second latency, different than the first latency, based on the at least one metadata frame and transmitting data to a host based on the second latency.

In one non-limiting embodiment, an arrangement is disclosed comprising means for receiving a computer command that has been dispatched to a flash translation layer of a solid state drive wherein a computer arrangement is operating at a first latency, means for performing a read flow operation on a computer buffer memory based on the computer command, means for populating at least one metadata frame with data based on logical block address latency information, means for initiating a serial attached data path transfer for one of transmitting and receiving data to the solid state drive, means for reading the at least one metadata frame with the logical block address latency information metadata frame, means for modifying the computer such that the computer operates at a second latency, different than the first latency, based on the at least one metadata frame and means for transmitting data to a host based on the second latency.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 3 is a data frame logical block address latency information configuration extending across eight (8) bits.

FIG. 4 is a Serial Attached SCSI (SAS) Data Frame Header illustrating available reserved field placement options for LBA Latency Information.

FIG. 5 is a concise logical block address latency information format example extending across eight (8) bits.

FIG. 6 is a view of the SAS Data Frame Header illustrating available reserved field placement options for concise LBA Latency Information for FIG. 5.

FIG. 7 is a view of an expanded logical block address latency formation format example extending over four (4) bytes.

FIG. 8 is a view of the SAS Data Frame Header illustrating available reserved field placement options for LBA Latency Information for FIG. 7.

FIG. 9 is a view of a logical block address latency score extending over two (2) bytes SAS Data Frame Header illustrating available reserved location placement options.

FIG. 10 is a view of the SAS Data Frame Header illustrating available reserved field placement options for LBA Latency Information for FIG. 9.

FIG. 14 is a view of a data frame logical block address latency debug control extending over eight (8) bits.

FIG. 15 is a view of the SAS Data Frame Header illustrating available reserved field placement options for the Debug Information specified by the debug information control of FIG. 14.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
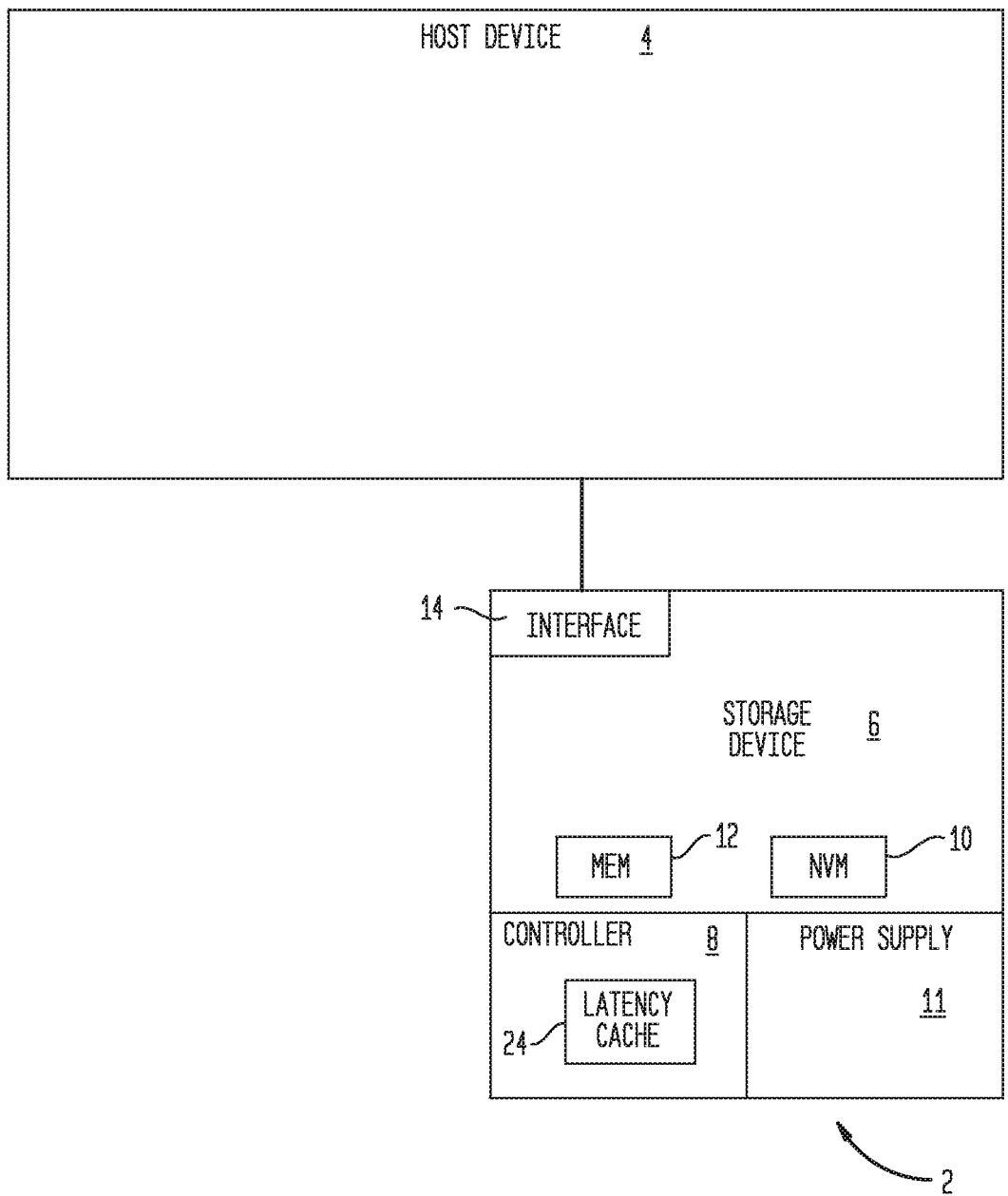
FIG. 1 is a diagram of an example host-storage configuration.

Some embodiments will now be described with reference to the figures. Like elements in the various figures will be referenced with like numbers for consistency. In the following description, numerous details are set forth to provide an understanding of various embodiments and/or features. It will be understood, however, by those skilled in the art that some embodiments may be practiced without many of these details and that numerous variations or modifications from the described embodiments are possible. As used herein, the terms "above" and "below", "up" and "down", "upper" and "lower", "upwardly" and "downwardly", and other like terms indicating relative positions above or below a given point or element are used in this description to more clearly describe certain embodiments.

Aspects of the present disclosure relate to computer operations and computer storage. In the embodiments described, a data storage arrangement is connected to a host system. The function of the data storage arrangement is to accept data and store the data until needed again by a user or the host. The data storage arrangement may be configured to accept bursts of data, depending on the computer process performed, therefore the data storage arrangement is configured with multiple memory units that provide for various states of usage. Certain sections of the data storage arrangement are configured of memory systems that provide for fast action (low latency) so that computer processes may be conducted at a rapid pace. Such low latency performance may be accomplished by single layer cell memory configurations. If bulk amounts of data are required to be stored, multiple layer cell memory configurations may also be present, such as triple level cell memory configurations. The data storage arrangement may have an interface that allows the data storage arrangement to connect with the host. The interface may be a SAS Interface or Serial ATA (SATA) compatible interface, as a non-limiting embodiments. The memory storage may have a configuration to allow for plug and play ability. Although described as having a SATA compatible interface, the memory storage device may be provided with a configuration which allows for access by wireless technology. In one non-limiting embodiment, 802.11ac technology may be used to provide for fast performance for smooth streaming. Wireless technology may use, for example, between 2.5 GHz to 5 GHz frequencies for connection. In some embodiments, the storage may allow users to choose the frequencies for wireless connection.

Auxiliary connections may be provided to the data storage arrangement to allow for addition options for inputting data directly to the data storage arrangement without interfacing with a host. Such direct input of data may be provided through placement of an integrated secure digital card to offload or copy data. Other auxiliary connections may be provided for additional input/output operations. Such connections may be USB 2.0, USB 3.0, Firewire or other hard wired configurations. Gigabit Ethernet interfaces and connections may also be used.

The data storage arrangement may be configured with a separate power supply or may be run through other power supply means, such as from a computer mother board. In some embodiments, an internal battery may be provided to power the data storage arrangement as an independent entity. Such configurations may be provided such that the data storage arrangement is a portable unit. In such data storage arrangement configurations, the power supply means may be sufficient to power a host and/or charge a host, such as a mobile cellular phone, personal computer, tablet, camera or other configuration. The data storage arrangement may also have a battery indicator to allow a user to understand the amount of charge in the data storage arrangement from a visual inspection. Such battery indicators may be, for example, low energy consumption light emitting diode technology. In specific embodiments, the data storage arrangement may be provided with a circuit to allow for charging and prevent overcharging of the system if the data storage arrangement is connected to an outside power supply for an extended period. In some embodiments, circuitry may be used to determine if a threshold of inactivity has been reached for the storage system, thereby causing the system to enter a low power consumption mode, conserving battery power.

In one non-limiting embodiment, a controller is provided to control actions of the data storage arrangement as required by the host. The controller may also be configured to perform maintenance activities for the data storage arrangement to allow for efficient use.

Internal software may be provided on the data storage arrangement to allow for efficient storage and read capability of data on the system. Such internal software may be used such that the data storage arrangement can be used as a portable media server to wirelessly stream media to a host or output device. Such output devices may include, but not be limited to, smart televisions, smart phones, stereo audio system. The internal software may also be provided such that the access of data may be performed by cloud applications designed for interface with the data storage arrangement.

The internal software of the data storage arrangement may also be configured to provide for security of the data storage arrangement. Safeguarding of material provided on the data storage arrangement prevents unauthorized access to sensitive information contained on the system. Such security may be in the form of password protection, such as a Wi-Fi password protection. In some embodiments, the data storage arrangement may be configured with software that allows the data storage arrangement to create a hardware lock. Such hardware locks may prevent access through a USB connection.

The internal software may also be capable of providing diagnostic support for users. In such configurations, two different modes may be provided. A quick test software program may be provided with the capability to check the data storage arrangement for major performance problems. A full test mode may also be provided to provide detailed status information to a user. Such status information may be, for example, total amount of memory of the data storage arrangement, the amount of memory storage used, storage divisions provided on the data storage arrangement, firmware versions for the internal software, memory block errors and similar data. The internal software may also have the capability of accepting data to update the firmware of the internal software.

The internal software may also be used as a server system wherein in certain embodiments, Digital Living Network Alliance (DLNA) enabled software is incorporated. Such software allows for quick file transfer and error checked operation as a server. In some embodiments, the internal software may be provided with the capability to use file transfer protocol (FTP) to enable the transfer of content to and from the memory storage in public access folders. The data storage arrangement may also provide for either a secured log in or an anonymous login capability.

In specific embodiments, the data storage arrangement may be configured such that the system interacts with cloud storage systems. In the event that the data storage arrangement approaches the limits of storage capability, the data storage arrangement may allow for some of the data to be stored on cloud based systems. Selection of the data to be stored on such external storage systems may be governed by the controller which is configured to determine what sections of data may be appropriately stored in cloud based systems to minimize latency for users. The storage system may have a unique identifier MAC address and device name to allow the system to operate on an independent basis. The storage system may also be operated in a configuration that allows for the system to clone a MAC address of a computer that is attached.

The overall capacity of the data storage arrangement may vary according to the different embodiments provided. Capacities 1 TB, 2 TB up to 64 TB may be provided, as non-limiting embodiments. Different form factors may also be provided. In the illustrated embodiment, a form factor of 2.5 inches is provided. Other form factors such as 1.8 inch or 3.5 inch may also be used. Compatibility of the data storage arrangement may be provided for Windows operating systems, Windows Server, Linux and Mac OS, as non-limiting embodiments. Example Windows operating systems that may use the system may be Windows 10, Windows 8 and Windows 7. Example Mac OS systems may be Lion (Mac OSA 10.7), Mountain Lion (Mac OS 10.8), Yosemite (Mac OS 10.10), El Capitan (Mac OS 10.11), Sierra and Mavericks as non-limiting embodiments. Supported browsers for the storage system may be, in non-limiting embodiments, Internet Explorer, Safari, Firefox and Google Chrome.

Software may also be included in the system to allow for quick and automatic backups of data according to user prescribed requirements. Such backup ability may be compliant with Windows based backup and restore functions and/or Apple Time Machine requirements. Furthermore, software may be provided to add more than one user to the storage system. Users can be added or deleted according to an administration account. Such administration account may also allow for restricted access for certain users according to administration requirements.

Aspect presented herein describe techniques for automatically measuring latency in computer systems when performing such activities as writing data to or reading data from a connected data storage device. As provided above, a data storage device may be connected to a computer through a hard wire connection or through a wireless connection. A controller included with the data storage device may be configured to record timestamps or place timestamps associated with events while executing read commands. The controller may include circuitry that is configured to record a timestamp when the read command is received, when the read command is executed and/or when other events associated with the read command occur. The controller may be configured to determine total elapsed time between any timestamps and record information about the operating characteristics of the computing system if an elapsed time is greater than a threshold amount of time. The techniques of this disclosure allow for inserting data related to logical block address latency to allow the system to identify what portions of the overall system are causing the greatest latency.

FIG. 1 is a conceptual and schematic block diagram illustrating an example storage environment 2 in which storage device 6 may function as a storage device for host device 4 in accordance with one or more techniques of this disclosure. For instance, host device 4 may utilize non-volatile memory devices included in storage device 6 to store and retrieve data. In some examples, storage environment 2 may include a plurality of storage devices such as storage device 6, which may operate as a storage array. For instance, storage environment 2 may include a plurality of storage devices 6 configured as a redundant array of inexpensive/independent disks (RAID) that collectively function as a mass storage device for host device 4.

Storage environment 2 may include host device 4 which may store and/or retrieve data to and/or from one or more storage devices, such as storage device 6. As illustrated in FIG. 1, host device 4 may communicate with storage device 6 via interface 14. Host device 4 may comprise any of a wide range of devices, including computer servers, network attached storage (NAS) units, desktop computers, notebook (i.e. laptop) computers, tablet computers, set-top boxes, telephone handsets such as so-called "smart" phones, so-called "smart" pads, televisions, cameras, display devices, digital media players, video gaming consoles, video streaming device, and the like.

As illustrated in FIG. 1, storage device 6 may include controller 8, non-volatile memory 10 (NVM), power supply 11, volatile memory 12 and interface 14. In some examples, storage device 6 may include additional components not shown in FIG. 1 for sake of clarity. For example, storage device 6 may include a printed circuit board (PCB) to which components of storage device 6 are mechanically attached and which includes electrically conductive traces that electrically interconnect components of storage device 6, or the like. In some examples, the physical dimensions and connector configurations of storage device 6 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe)(e.g. PCIe x1, x4, x8, x16, PCIe Mini Card, MiniPCI, etc.). In some examples, storage device 6 may be directly coupled (e.g., directly soldered) to a motherboard of host device 4.

Storage device 6 may include interface 14 for interfacing with host device 4. Interface 14 may include one or both of a data bus for exchanging data with host device 4 and a control bus for exchanging commands with host device 4. Interface 14 may operate in accordance with one or more of the following protocols: advanced technology attachment (ATA) (e.g. serial-ATA (SATA) and parallel-ATA (PATA)), Fibre Channel Arbitrated Loop (FCAL), small computer system interface (SCSI), serially attached SCSI (SAS), PCI, and PCIe, non-volatile memory express (NVMe), or the like. The electrical connection of interface 14 (e.g., the data bus, the control bus, or both) is electrically connected to controller 8, providing electrical connection between host device 4 and controller 8, allowing data to be exchanged between host device 4 and controller 8. In some examples, the electrical connection of interface 14 may also permit storage device 6 to receive power from host device 4. For example, as illustrated in FIG. 1, power supply 11 may receive power from host device 4 via interface 14.

Storage device 6 may include NVM 10, which may include a plurality of memory devices. NVM 10 may be configured to store and/or retrieve data. For instance, a memory device of NVM 10 may receive data and a message from controller 8 that instructs the memory device to store the data. Similarly, the memory device of NVM 10 may receive a message from controller 8 that instructs the memory device to retrieve data. In some examples, each of the memory devices may be referred to as a die. In some examples, a single physical chip may include a plurality of dies (i.e., a plurality of memory devices). In some examples, each memory device may be configured to store relatively large amounts of data (e.g., 128 MB, 256 MB, 512 MB, 1 GB, 2 GB, 4 GB, 8 GB, 16 GB, 32 GB, 64 GB, etc.)

In some examples, each memory device of NVM 10 may include any type of non-volatile memory devices, such as flash memory devices, phase-change memory (PCM) devices, resistive random-access memory (ReRAM) devices, magnetoresistive random-access memory (MRAM) devices, ferroelectric random-access memory (F-RAM), holographic memory devices, and any other type of non-volatile memory devices.

Flash memory devices may include NAND or NOR based memory devices. These devices may store data in a number of configurations. In NAND flash memory devices, for example, the flash memory device will be divided into a plurality of blocks which may be divided into a plurality of page(s). Rows of NAND cells may be electrically connected using a word line to define a page. Respective cells in each of the plurality of pages may be electrically connected to respective bit lines. Controller 8 may write data to and read data from NAND flash memory devices at the page level and erase data from NAND flash memory devices at the block level.

The storage device may include a power supply 11, which may provide power to one or more components of storage device 6. When operating in a standard mode, power supply 11 may provide power to the one or more components using power provided by an external device, such as host device 4. For instance, power supply 11 may be configured to provide power to at least one component using power received from the host device 4. The power may be received via an interface 14 or may be received through a separate connection. Power may also be stored or supplied by power storage components, such as capacitors, super capacitors or batteries.

The storage device 6 may include a volatile memory 12 that may be used by the controller 8 to store information. In some examples, controller 8 may use volatile memory 12 as a cache. In a non-limiting embodiment, controller 8 may store cached information in volatile memory 12 until cached information is written to non-volatile memory 10. As provided in FIG. 1, the volatile memory 12 receives power from the power supply 11. Non-limiting examples of volatile memory 12 may include random-access memory (RAM), dynamic random access memory (DRAM), static RAM (SRAM) and synchronous dynamic RAM (SDRAM).

The controller 8 of the storage device 6 may be configured to manage at least one operation of the storage device 6. For instance, controller 8 may manage the reading of data from and/or the writing of data to non-volatile memory 10.

In some examples, controller 8 may measure latency in storage device 6 and record latency information about storage device 6. For example, if storage device 6 receives a read command from host device 4, controller 8 may initiate a data retrieval command to retrieve data from non-volatile memory 10 and monitor the process of data retrieval. In non-limiting examples, the controller 8 may be configured to determine a time indicative of initiating data retrieval command. For example, controller 8 may determine a time indicative of initiating the data retrieval command by determining a time when controller 8 received the read command from host device 4, began to execute the data retrieval command, or received a first data frame from non-volatile memory 10. In some examples, controller 8 may determine a time indicative of terminating the data retrieval command by determining a time when controller 8 received a last data frame from non-volatile memory 10 or sent a status frame (e.g. a frame indicating whether the data transfer was successful) to host device 4.

If the storage device 6 receives a write command from host device 4, controller 8 may initiate a data storage command to store data to non-volatile memory 10 and monitor the progress of the data storage command. In some examples, controller 8 may determine a time indicative of initiating the data storage command by determining a time when controller 8 received the write command from host device 4, began to execute the data storage command, or received a first data frame from host device 4. In some examples, controller 8 may determine a time indicative of terminating the data storage command. For example, controller 8 may determine a time indicative of terminating the data storage command by determining a time when controller 8 received a last data frame from host device 4, or sent a status frame (e.g. a frame indicating whether the data transfer was successful) to host device 4.

Controller 8 may store timestamp information associated with the data retrieval command (or data storage command) in latency monitoring cache 24. For example, controller 8 may determine a timestamp associated with the time indicative of initiating the data retrieval command (or data storage command) and may cause the timestamp to be stored in latency monitoring cache 24. Likewise, controller 8 may determine a timestamp associated with the time indicative of terminating the data retrieval command (or data storage command) and may cause the timestamp to be stored in latency monitoring cache 24. In some examples, the granularity of the timestamps stored in latency monitoring cache 24 may be configurable. For example, controller 8 may store timestamp information in increments as small as 10 nanoseconds to increments of 10 microseconds or more.

In some examples, controller 8 may measure latency in storage device 6 based on the timestamps stored in latency monitoring cache 24. For example, controller 8 may determine an elapsed time between two timestamps stored in latency monitoring cache 24 and compare the elapsed time to a threshold amount of time. In response to determining that the elapsed time satisfies a threshold amount of time (e.g. the elapsed time is greater than threshold amount of time), controller 8 may determine at least one operational characteristic of storage environment 2 and cause the at least one operational characteristic of storage environment 2 to be stored to a memory device (e.g., non-volatile memory 10 or volatile memory 12). For example operational characteristics may include controller register information, firmware data structures, firmware event history, host configured mode settings (e.g. formatted capacity, Power Modes, Encryption Modes, and the like), device state (e.g. amount of drive used, temperature of device, state of SMART parameters, etc.) host command sequence and history, and so on. Examples of firmware data structures may include performance and workload statistics, error statistics, and state information about non-volatile memory (such as amount of valid customer data and amount of memory ready to store new customer data). In some examples, controller 8 may store the operational characteristics in a system area of NVM 10.

Controller 8 may enable storage device 6 to measure latency in storage environments 2 in real time. By measuring latency information in real time, storage device 6 may detect higher than normal latency and store information about the operational characteristics of storage environment 2 for analysis at a later time. In contrast to traditional latency measuring techniques, which require a user to attempt to recreate a similar computing environment in order to determine the cause of latency, the described techniques may enable storage device 6 to store the latency measurements and actual operation characteristics of storage environment 2 when storage device 6 experiences higher than normal latency. As a result, storage device 6 may output the actual latency measurements and the actual operational characteristics of storage environment 2 so that a user may more easily and more accurately determine the cause of the latency.

In the embodiments described below, users may be provided with a unique mechanism to return logical block address latency status. The logical block latency status is provided in existing reserved fields of SAS header for data frames. As an example embodiment, the latency status may be included in the SAS header via a "Data Frame LBA Latency Info Config." Field in Mode Page 0x00.

Hardware is provided to the data storage devices that allow for the capability to program various field in the Data Frame SAS headers. The logical block address latency status information may be populated in existing metadata fields by the use of firmware.

In the embodiments provided, SAS data frames may support 2 logical block addresses per SAS data frame. The header information for the SAS data frames are associated with the logical block addresses that start in the current SAS frame to handle cases where logical block addresses are not evenly aligned. Other supported modes may be limited to populate logical block address latency information for the logical block addresses at the start of each indirection unit.

In the embodiments described, the solid state storage device logical block address information provided may vary. The information may provide for a provisioning status, (for example a mapped, unmapped, specific unmapped pattern type), a caching status (e.g. cache hit or media access), an error recovery procedure, an erase or program collision status (e.g. media access latency due to active program or erase, access latency minimized by using erase or program), restricted reordering collision status (e.g. serializer latency experienced due to logical block address collision) and system resource latency status (e.g. latency experienced due to buffer RAM allocation delay).

In the embodiments provided, a flexible internal development debugging tool is provided to append various metadata content to SAS (serial attached SCSI) data frames. The debugging tool provides for physical location information (die, block, page information), internal latency statistics (command performance monitor statistics (CPSM) Output) and error recovery information (ECC correction, read retries, XOR rebuild).

Figure 2:
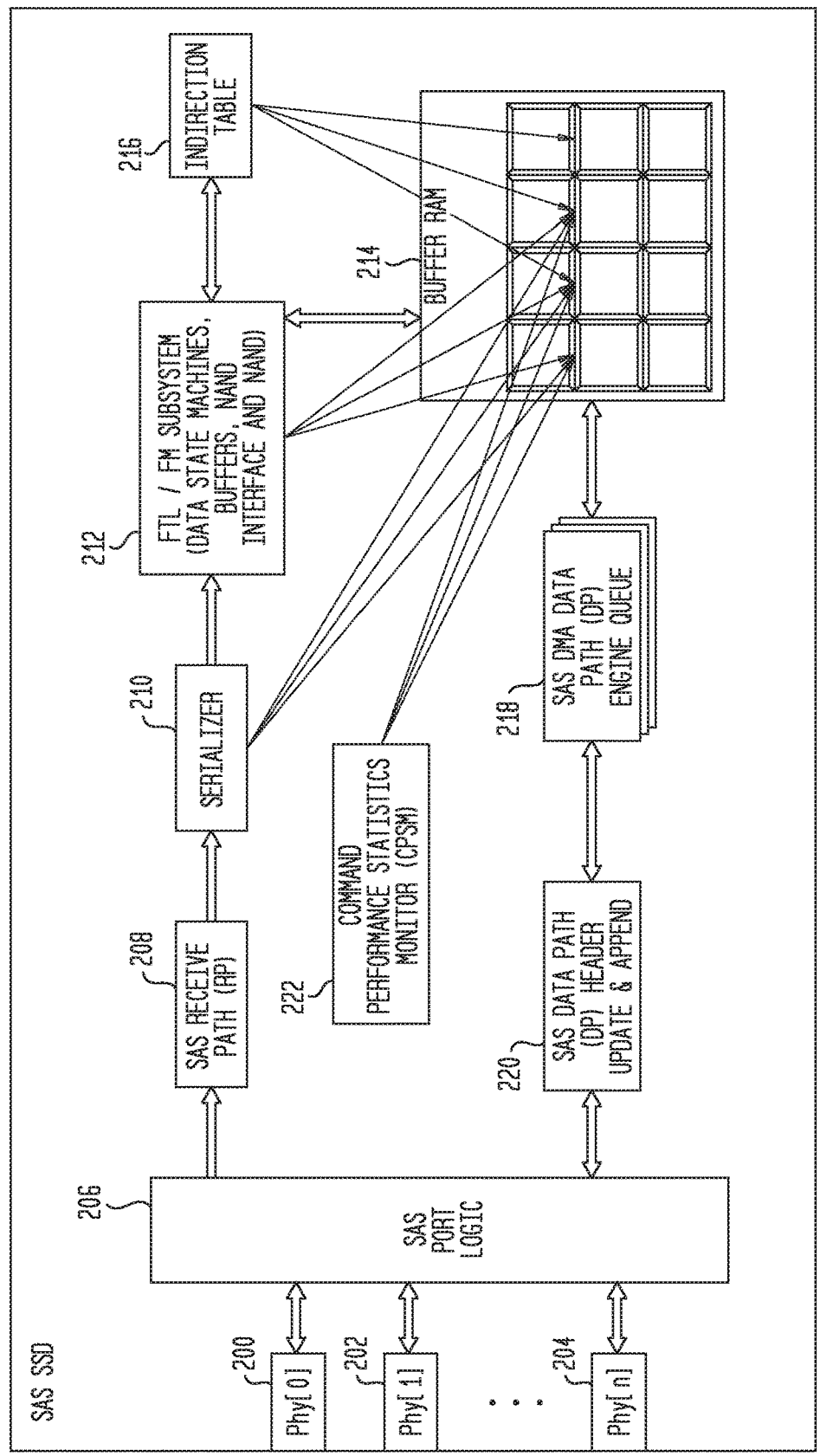
FIG. 2 is a logical block address latency information flow diagram.

Referring to FIG. 2, a logical block address latency information flow diagram is illustrated. The logical block address latency information allows for individual circuitry, phy[0] 200, phy[1] 202, . . . phy[n] 204 that accepts data from, for example, a host. The data is passed from the individual circuitry 200, 202, 204 to a SAS port logic 206. The SAS port 206 is considered a "wide" port as the number of circuitry inputs is greater than one.

The SAS port logic 206 is connected to a SAS receive path 208. The SAS receive path 208 is connected to a serializer 210. The serializer 210 is connected to the FTL/FM subsystem (data state machines, buffers, NAND interface and NAND) 212. The FTL/FM subsystem (data state machines, buffers, NAND interface and NAND) may interact with buffer ram 214 and an indirection table 216. The buffer RAM 214 is connected to a SAS DMA Data Path (DP) engine queue 218. The SAS DMA Data Path (DP) engine queue 218 is connected to a SAS Data Path (DP) Header update and append block 220. The SAS Data Path (DP) Header update and append 220 completes the loop and connection with the SAS port logic 206. A command performance statistics monitor CPSM 222 is also provided to interact with the Buffer RAM 214.

Referring to FIG. 3, a logical block address latency information control field is illustrated. The field is used to define the location and format of the data frame latency information being collected for the associated data. Regarding FIG. 3, a data frame logical block address latency information configuration 300 is illustrated. The extent of the configuration is 8 bits, namely bits 0, 1, 2, 3, 4, 5, 6, 7. Such logical block address information may be added to data streams, as provided in the SAS Frame Header as provided in FIG. 4. Referring to FIG. 3, the latency information 302 format may extend across bits 0, 1, 2 and 3. A latency content of 0 disables the feature. In the illustrated embodiment, sixteen different options exist for various logical block address latency content.

Further referring to FIG. 3, bit 4 contains the LPage value 304. The LPage value 304 specifies whether data is populated for a host block or L-pages. A value of 0 indicates that latency information is populated for each host block boundary in the SAS boundary data frame. A value of 1 indicates that the logical block address latency information is only populated when a new L-Page boundary is crossed in a SAS data frame.

Still further referring to FIG. 3, a frame header location 306 is provided for bits 5, 6 and 7. This configuration provides for eight (8) possible options for the data frame header location of the logical block address latency information.

Referring to FIG. 4, the latency information format location provided in FIG. 3 that extends from bits 0, 1, 2, and 3, is illustrated in more detail. As provided in the X axis bytes 0, 1, 2 and 3 are shown. The amount of SAS data frame header offset is shown extending from the value of 0 to subsequent values 4, 8, 12, 16 and 20. In various configurations, the latency information format can range from a "concise format" (single byte of content or less) to a "verbose format" (several bytes of content). Options to provide latency information in the data frame header information for the start of each logical block address or start of each indirection unit exist based on the setting of LPage bit 304 in FIG. 3. A concise option for latency format consists of a 4 bit concise arrangement to characterize latency. The concise arrangement may be, as a non-limiting embodiment, mapped/unmapped bit, cache hit bit, ERP needed bit and an erase/program collision bit. The verbose option for latency format may comprise 1 or 2 bytes to characterize latency. Multiple bit fields of more verbose information and descriptor index modes to provide detailed latency information exist based on the setting of Latency Information Format field 302 in FIG. 3.

Further referring to FIG. 4, the SAS frame header location may be provided in optional locations. Such locations, as illustrated in FIG. 4 and labeled as reserved fields 401, 402, 403, are between the destination address field and the source address field with a frame header offset of 4, between the source address field and the control flags/fill bytes field with a frame header offset of 8, and between the Control Flags/fill bytes field and the Target Tag field with a data frame header offset of 12.

Referring to FIG. 5, a concise logical block address latency information format field example is provided. The concise logical block address latency information is provided into a first logical block address in SAS frame 500, extending from bit 0 to the end of bit 3 and a second logical block address in SAS frame 502, extending from bit 4 to 7. The concise version, provided in FIG. 5, provides a single bit for each of map information, cache information, ERP information and collision information. Serializer information, buffer allocation and CPSM system latency data is not contained in the concise logical format type. As such information is not contained in the data stream, two logical block addresses in SAS frames can be provided over eight (8) bits. Map information, which is provided in Bit 0, provides data on if the data is mapped (value 0) or the data is unmapped (value 1). Cache data specifies whether the logical block address was cache hit or not. A value of 0, indicates that the data was read from media, and a value of 1 indicates that the cache hit resulted in data already being resident in buffer RAM and transferred from buffer RAM without requiring a read from media. Error recovery procedure (ERP) specifies whether error recovery (for example read retries, XOR rebuild) was used to recover the logical block address. If a value of 0 is present, then no error recover procedure was used. If the value of 1 is present, error recovery procedures were used to recover this data. Collision information specifies whether NAND Read commands collided and were stalled due to another NAND erase or NAND program command. If a value of 0 is present, NAND read experienced no collisions with other NAND commands. If the value of 1 is present, NAND read experienced latency delays due to collision(s) with other NAND commands.

Referring to FIG. 6, the locations 601, 602, 603 for the data frame for logical block latency fields may be entered. The frame header location may be set from 0 to 6 to select different reserved byte locations to hold the logical block address latency information. Location 0 is in the reserved byte 0 on SAS Data Frame Header Offset 4, locations 1 and 2 are in in reserved bytes 0 and 1 respectively in SAS Data frame header offset 8, locations 3, 4, 5 and 6 are in reserved bytes 0 through 3 respectively in SAS Data frame header offset 12.

Referring to FIG. 7, an expanded logical block address latency field example is disclosed covering four (4) bytes. In the first logical block address latency information 700, the information is divided into map information, cache types, error recovery procedure types and collision information extend across byte 0, bits 0 to 7. In another set of information spanning byte 1, bits 0 to 7 for the first logical block address latency information, serializer data, buffer allocation and CPSM system latency is provided. In a like configuration, a second set 702 of logical block address information also extends across bytes 2 and 3.

Still further referring to FIG. 7, the individual data values will be described and the values relevance to the logical block address latency information contained therein. Map information specifies whether the logical block address is mapped or unmapped. A value of 0 indicates that the value was mapped. A value of 1 indicates that the value was unmapped and used a pattern #1 fill. A value of 2 indicates that the value was unmapped and used a pattern #2 fill. A value of 3 indicates that the value was unmapped and used pattern #3 fill. Cache type information specifies whether the logical block address was a cache hit. A value of 0 indicates that the data was read from media. A value of 1 indicates that a cache hit detected in a read buffer RAM. A value of 2 indicates a cache hit detected in a write buffer RAM. A value of 3 indicates a cache hit detected in a read ahead area.

Data for the error recovery procedure (ERP) specifies whether there has been any error recovery usage. A value of 0 for this data indicates that no error recovery procedure was used. A value of 1 indicates that read retries were used to recover data. A value of 2 indicates that XOR rebuild was used to recover data. For data related to collisions "Collision Info", extending across bits 6 and 7, a value of 0 indicates that the read experienced no collisions with other NAND commands. A value of 1 indicates that a NAND read experienced collision with NAND program commands. A value of 2 indicates that the NAND read experienced a collision with the NAND erase command. A value of 3 indicates that the NAND read collision forced suspend of NAND programs or erasures.

Serializer latency information specifies the latency caused by serializer activities with the storage system or received by the system. There are four levels of latency impacts, wherein 0 indicates a value of no latency, a value of 1 indicates low latency, a value of 2 indicates medium latency and a value of 3 indicates high latency.

Buffer allocation latency specifies latency during buffer allocation, as needed. Four (4) different latency impacts are described, wherein 0 indicates a value of no latency, a value of 1 indicates low latency, a value of 2 indicates medium latency and a value of 3 indicates high latency.

A command performance statistics monitoring (CPSM) system latency is provided to specify the total system latency for the systems that are non-host related. Four system time based values are provided that describe the overall system latency.

Referring to FIG. 8, the locations 801, 802, 803 of the data frame logical block address field are provided. The first location 801 is provided in the reserved section that extends from byte 0 to byte 1 on the SAS data frame header offset value 8 and byte 0 to byte 1 on the SAS data frame header offset value 12. A second location 802 is provided in the reserved section that extends from byte 0 to byte 1 on the SAS data frame header offset value 8 and from byte 2 to byte 3 on the SAS data frame header offset value 12. A third location 803 is provided in the reserved section extending from byte 0 to byte 3 along SAS data frame header offset value 12.

Referring to FIG. 9, logical block address latency score based format examples are provided. The latency information format field is set to the value of three (3) to specify latency score based LBA latency information where each logical block address has a one byte latency score. The logical block address latency score information is a number of 0 to 255 that would correlate to the amount of internal drive latency that was accumulated to access the logical block address. In FIG. 9, A $1^{ST}$ LBA Latency Description index and a $2^{nd}$ LBA Latency Description index are illustrated. The frame header location, in non-limiting embodiments, is set from 0 to 2 to select different reserved byte locations to hold the logical block address latency information. The drive assigns this score using accumulation of internal latency components to access and transfer the requested logical block address. The host can use the logical block address latency score to understand the relative latency of various logical block address and/or determine the absolute latency for specific logical block addresses. As provided in FIG. 9, two logical based latency score headers are shown extending from bit 0 through bit 7 in byte 0 and byte 1.

Referring to FIG. 10, is the location 1000, 1001 of the LBA latency score provided in FIG. 9. The value 0 to 2, as described above, selects different reserved byte locations. In the Illustrated embodiment, the reserved sections on SAS data frame header offset 8 and 12 are reserved locations for the latency score as well as beginning at byte 2 at SAS data frame header offset value 12.

Figure 11:
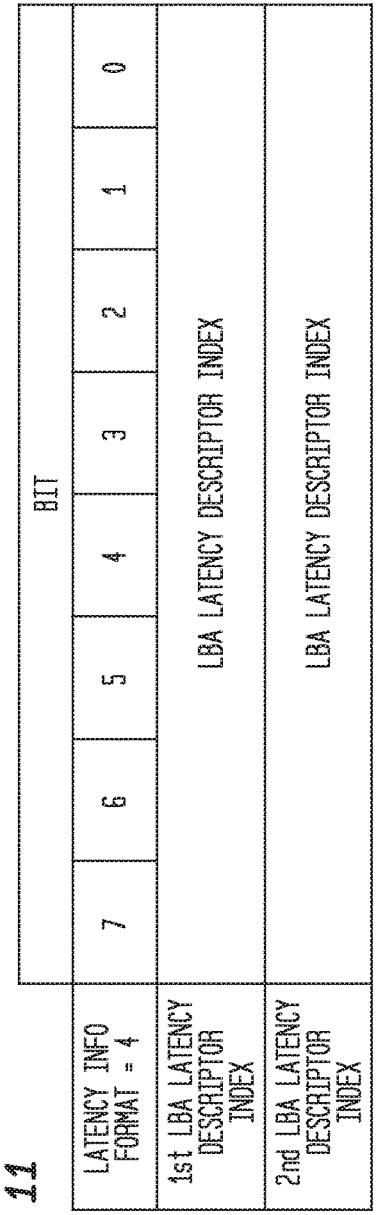
FIG. 11 is a view of logical block address latency descriptor index over two (2) bytes.

Referring to FIG. 11, the location for the logical block address latency descriptor index score header information is provided. A $1^{st}$ LBA latency descriptor index may extend from bit 0 through bit 7 in the first byte. A $2^{nd}$ LBA latency descriptor index may extend from bit 0 through bit 7 in the second byte.

The verbose descriptor for the data frame logical block address latency configuration, as provided in FIG. 11 may be set to the value of four (4) to specify a Verbose descriptor based logical block address latency information configuration. Each logical block address may have a one byte descriptor index that associates to a logical based latency descriptor maintained within the drive that contains full latency profile information for the logical block address. The frame header location may be set from the value 0 to 2 to select different reserved byte locations to hold the logical block address latency information. Referring to FIG. 11, two logical block address latency descriptor indexes are illustrated, extending from bit 0 through bit 7 in byte 0 and 1.

Figure 12:
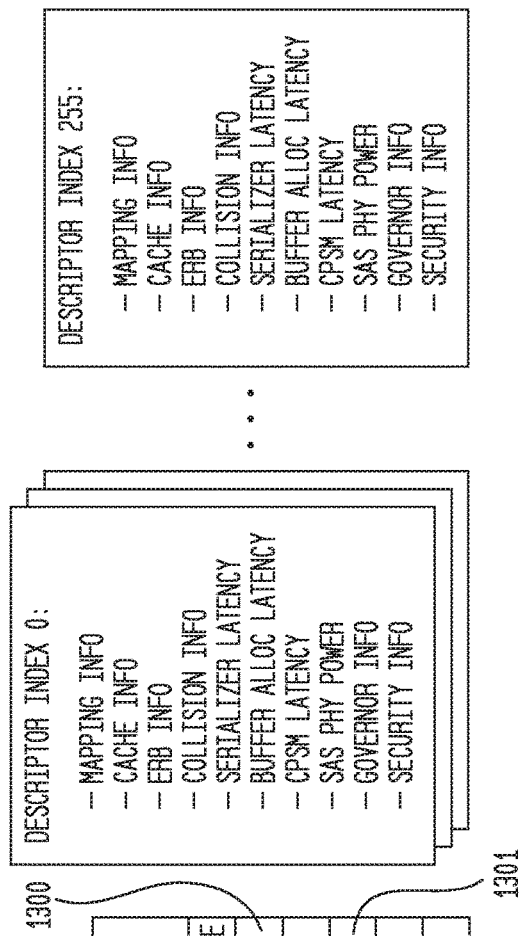
FIG. 12 is a view of a logical block address latency descriptor index for a verbose descriptor.

Logical block address latency descriptor index details provide that a drive would maintain up to 256 unique logical block address latency descriptors with each descriptor containing unique latency profile information and other latency characteristics. Logical block address latency descriptors, in some embodiments, may be large, as necessary, to provide all pertinent latency information. As a non-limiting embodiment, the latency descriptors may be 16, 32, 48 or 64 bytes. Referring to FIG. 12, logical block address latency descriptors may include information such as logical block address mapping, cache information, ERP information, serializer information, buffer allocation information, command performance statistics monitoring information, SAS phy power governor information and security information. The drive may support vendor unique commands to allow a host to retrieve the list of logical block address latency descriptors. In embodiments, the host may be able to query the drive to retrieve the logical block address latency descriptors from the drive to correlate the logical block latency information to the logical block address latency descriptor indexes provided in the data frames.

Figure 13:
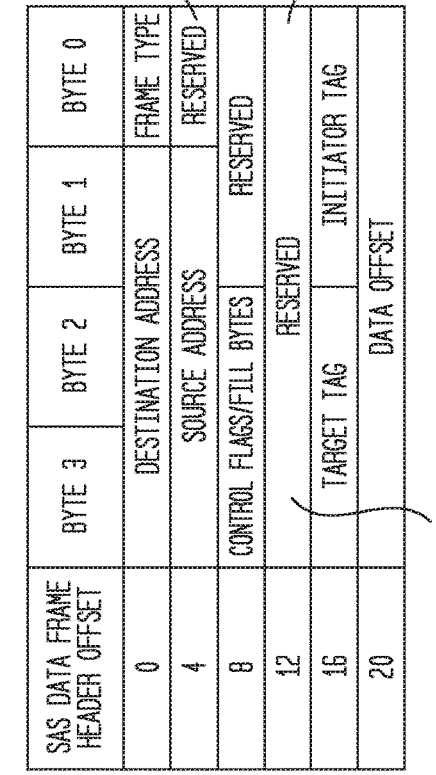
FIG. 13 is view of the SAS Data Frame Header illustrating available reserved field placement options for the LBA Latency Descriptor Index from FIG. 11.

Locations 1300, 1301, 1302 for the verbose descriptor based format examples are shown in FIG. 13. A first location 1300 for the verbose descriptor is the reserved field in byte 1 and byte 2 on the SAS data frame header offset value of 8. A second location 1301 for the verbose descriptor is the reserved field in byte 0 and byte 1 on the SAS data frame header offset value 12. A third location 1302 for the verbose descriptor is in the reserved field in byte 2 and byte 3 on the SAS data frame header offset value 12.

A data frame for a logical block address latency debug control is also provided, as illustrated in FIG. 14. The data frame for the logical block address latency debug control is a new one (1) byte control field that is accessible by internal development. The debug information format extends from bits 0 through 7 (8-bits). In the illustrated embodiment there are 256 options for various debug frame content where a value of 0 disables this feature. In specific embodiments, an external user configurable "data frame logical block address latency information configuration field" may have priority over this field and may be disabled before this debug information is provided.

Debug information format may differ from other data frames described above. The field may not be directly accessible by users. The field may be ignored if the data frame logical block address latency information configuration field is enabled. The field is intended to be free-form to allow for developer customization. Hardware implementation may consist of a SAS data frame offset which configures the SAS data frame header offset for reserved field destination where metadata content may be copied. As a non-limiting embodiment, a value of 4, 8, 9 or 12 may be provided. The byte count configures the number of bytes of metadata content to copy, for example 1 to 7. A metadata offset configures the offset in metadata source content. In specific embodiments, the hardware copies metadata from the programmed course metadata offset to the destination SAS data frame offset for the byte count for each data frame.

Firmware functionality options for the logical block latency debug control may provide for dumping varieties of internal (on-the-fly) debug content while running tests. Debug content that may be dumped includes background start/stop or stats (e.g. read disturb statistics, open/close bands, logging), error rates/counts (e.g. OTF ECC correction, read retries, XOR rebuild) and performance statistics (CPSM, Command counts, QD, band validity statistics). Unique triggers may be provided for either one time events or periodic events for use in marking events to assist in SAS analyzer triggers or trace analysis. Command runtime information may also be provided, wherein a physical location may be provided, error correction information and hardware system debug information.

In an alternative configuration, conventional systems may periodically issue standard T10 mechanism commands, such as "get LBA status", "log commands", etc. By using these conventional systems and methods, however, the host continues to experience latency associated impacts from issuing T10 commands.

In the above-identified embodiments, a mechanism is provided for users to directly gather real time information on logical block address specific latency impacts with no noticeable performance impacts. In the embodiments provided, the host does not need to issue dedicated commands to retrieve drive latency impact information. In non-limiting embodiment, the host may utilize a SAS analyzer to capture device latency to aid in tuning overall system performance.

The host may modify system firmware to capture and parse drive latency impact information directly from data frame headers, for example.

The embodiments described provide customer controls to configure logical block address latency information content, location and verbosity. The controls may be dynamically adjusted to support different reporting requirements on different workloads or systems.

The embodiments also provide a real-time latency analysis tool. The real-time latency analysis tool allows for characterization of existing performance bottlenecks for use in selecting areas for future investments in controller features of firmware designs.

The embodiments also provide other benefits, such as a system level debug environment. Logical block addressing latency information can be customized for analysis and characterization of specific problems under investigation. The embodiments provide an ability to provide custom trigger mechanisms for the SAS analyzer or host systems during host/device debug. Responses to customer latency questions and problems may be provided simply by data captured by the SAS analyzer.

The embodiments provided also allow for solutions that are implemented with minimal resources. Minor application specific integrated circuit changes are required for implementation of the designs provided. Minor firmware changes and minimal resource impacts are presented by the system provided.

While embodiments have been described herein, those skilled in the art, having benefit of this disclosure will appreciate that other embodiments are envisioned that do not depart from the inventive scope of the present application. Accordingly, the scope of the present claims or any subsequent related claims shall not be unduly limited by the description of the embodiments described herein.

In one non-limiting embodiment a method for control of latency information through logical block addressing is disclosed comprising receiving a computer command that has been dispatched to a flash translation layer of a computer drive wherein a computer arrangement is operating at a first latency, performing a read flow operation on a computer buffer memory based on the computer command, populating at least one metadata frame with data based on logical block address latency information, initiating a data transfer for one of transmitting and receiving data to the computer drive, reading the at least one metadata frame with the logical block address latency information metadata frame, operating the computer arrangement at a second latency, different than the first latency, based on the at least one metadata frame and transmitting data to a host based on the second latency.

In another non-limiting embodiment, the method may be performed wherein the logical block address latency information is provided by a solid state drive.

In another non-limiting embodiment, the method may be performed wherein the logical block address latency information includes a provisioning status.

In another non-limiting embodiment, the method may be performed wherein the logical block address latency information includes a caching status.

In another non-limiting embodiment, the method may be performed wherein the logical block address latency information includes erase and program collision information.

In another non-limiting embodiment, the method may be performed wherein the logical block address latency information includes a latency score.

In another non-limiting embodiment, the method may be performed wherein the logical block address latency information includes an error recovery status.

In another non-limiting embodiment, the method may be performed wherein the logical block address latency information includes a restricted reordering collision information.

In another non-limiting embodiment, the method may be performed wherein the metadata is one of a concise and a verbose descriptor arrangement.

In another non-limiting embodiment, the method may be performed wherein the metadata is configured to address multiple data blocks.

In another non-limiting embodiment, the method may further comprise receiving the data at the host.

In another non-limiting embodiment, the method further comprise adapting activities of the host based on the received data.

In another non-limiting embodiment, the method further comprise displaying latency data to a user.

In another non-limiting embodiment, the method may further comprise receiving host latency information from the host at the solid state drive.

In another non-limiting embodiment, the method may further comprise operating the solid state drive according to the host latency information.

In another non-limiting embodiment, the method may be performed wherein the computer drive is a solid state drive.

In another non-limiting embodiment, the method may be performed wherein the computer arrangement is a personal computer.

In another non-limiting embodiment, the method may be performed wherein the computer arrangement is a server.

In another non-limiting embodiment, an arrangement is disclosed comprising means for receiving a computer command that has been dispatched to a flash translation layer of a solid state drive wherein a computer arrangement is operating at a first latency, means for performing a read flow operation on a computer buffer memory based on the computer command, means for populating at least one metadata frame with data based on logical block address latency information, means for initiating a serial attached data path transfer for one of transmitting and receiving data to the solid state drive, means for reading the at least one metadata frame with the logical block address latency information metadata frame, means for modifying the computer such that the computer operates at a second latency, different than the first latency, based on the at least one metadata frame and means for transmitting data to a host based on the second latency.

What is claimed is:

1. A method for control of latency information through logical block addressing, comprising:

receiving a computer command that has been dispatched to a flash translation layer of a computer drive wherein a computer arrangement is operating at a first latency;

performing a read flow operation on a computer buffer memory based on the computer command;

populating at least one metadata frame with data based on logical block address latency information, wherein the at least one metadata frame is a serial attached SCSI data frame;

initiating a data transfer for one of transmitting and receiving data to the computer drive;

reading the at least one metadata frame;

operating the computer arrangement at a second latency, different than the first latency, based on the at least one metadata frame; and transmitting data to a host based on the second latency.

2. The method according to claim 1, wherein the logical block address latency information is provided by the computer drive, wherein the computer drive is a solid state drive.

3. The method according to claim 2, wherein the logical block address latency information includes a provisioning status.

4. The method according to claim 2, wherein the logical block address latency information includes a caching status.

5. The method according to claim 2, wherein the logical block address latency information includes an unmapped pattern type.

6. The method according to claim 2, wherein the logical block address latency information includes erase and program collision information.

7. The method according to claim 2, wherein the logical block address latency information includes a latency score.

8. The method according to claim 2, wherein the logical block address latency information includes an error recovery status.

9. The method according to claim 2, wherein the logical block address latency information includes a restricted reordering collision information.

10. The method according to claim 1, wherein the at least one metadata frame is a verbose descriptor arrangement.

11. The method according to claim 1, wherein the at least one metadata frame is configured to address multiple data blocks.

12. The method according to claim 1, wherein the at least one metadata frame is configured to provide an external analyzer trigger.

13. The method according to claim 1 wherein the at least one metadata frame is configured to provide device internal system debug information.

14. The method according to claim 1, further comprising: receiving the data at the host.

15. The method according to claim 14, further comprising:
adapting activities of the host based on the received data.

16. The method according to claim 15, further comprising:
displaying latency data to a user.

17. The method according to claim 1, further comprising:
receiving host latency information from the host at the computer drive.

18. The method according to claim 17, further comprising:
operating the computer drive according to the host latency information.

19. The method according to claim 1, wherein the computer drive is a solid state drive.

20. The method according to claim 1, wherein the computer arrangement is a personal computer.

21. The method according to claim 1, wherein the computer arrangement is a server.

22. An arrangement comprising:
means for receiving a computer command that has been dispatched to a flash translation layer of a solid state drive wherein a computer arrangement is operating at a first latency;
means for performing a read flow operation on a computer buffer memory based on the computer command;
means for populating at least one metadata frame with data based on logical block address latency information, wherein the at least one metadata frame is a serial attached SCSI data frame;
means for initiating a serial attached data path transfer for one of transmitting and receiving data to the solid state drive;
means for reading the at least one metadata frame;
means for modifying the computer such that the computer operates at a second latency, different than the first latency, based on the at least one metadata frame; and
means for transmitting data to a host based on the second latency.

23. A method for control of latency through logical block addressing, comprising:
receiving a computer command at a computer drive flash translation layer operating at a first latency;
performing an operation on a computer buffer memory based on the computer command;
populating at least one metadata frame with logical block address latency information, wherein the at least one metadata frame is a serial attached SCSI data frame;
initiating one transmitting and receiving data to the computer drive;
reading the at least one metadata frame;
operating the computer drive at a second latency, different than the first latency, based on the at least one metadata frame; and
transmitting data to a host at the second latency.

24. The method according to claim 23, wherein the operation is a read operation.

25. The method according to claim 23, wherein the logical block address latency information includes a provisioning status.

* * * * *